(12) United States Patent
Blais

(10) Patent No.: US 12,709,326 B2
(45) Date of Patent: Aug. 18, 2026

(54) DYNAMIC STEERING ANGLE RATIO ADJUSTMENT INDICATION FOR A VEHICLE STEERING SYSTEM

(71) Applicant: BlackBerry Limited, Waterloo (CA)

(72) Inventor: Pierre Pierre Blais, Kanata (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 18/748,395

(22) Filed: Jun. 20, 2024

(65) Prior Publication Data

US 2025/0074505 A1 Mar. 6, 2025

Related U.S. Application Data

(60) Provisional application No. 63/579,597, filed on Aug. 30, 2023.

(51) Int. Cl.
*B62D 6/00* (2006.01)

(52) U.S. Cl.
CPC .................................... *B62D 6/00* (2013.01)

(58) Field of Classification Search
CPC ................................. B62D 6/00; B62D 6/002
See application file for complete search history.

(56) References Cited

U.S. PATENT DOCUMENTS

2003/0225494 A1* 12/2003 Coelingh ................ B62D 6/04
701/36
2016/0297439 A1* 10/2016 Inoue ................. B60W 10/184
2021/0031827 A1 2/2021 Karve et al.
2021/0070361 A1 3/2021 Erickson et al.
2022/0009516 A1* 1/2022 Sakashita .................. B60R 1/00
2022/0017082 A1* 1/2022 Sakashita .......... B60W 60/0053
2022/0396259 A1* 12/2022 Balachandran ....... B60W 30/02
2023/0347972 A1* 11/2023 Sakayori ............... B62D 6/008
2024/0294183 A1* 9/2024 Yuan .................... B60W 40/10

FOREIGN PATENT DOCUMENTS

CN 111433110 B 6/2021
JP 2010215067 A 9/2010
JP 2021138250 A 9/2021
JP 2004090758 A 3/2024

OTHER PUBLICATIONS

Sterthoff et al., Vehicle handling improvements through Steer-by-Wire, Apr. 6, 2021 (8 pages).
Danfoss, Steer-by-wire, Sep. 2020 (19 pages).
Covesa, Vehicle Signal Specification downloaded Aug. 3, 2023 (2 pages).

(Continued)

*Primary Examiner* — Long T Tran

(74) *Attorney, Agent, or Firm* — Conley Rose, P.C.; J. Robert Brown, Jr.

(57) ABSTRACT

In some examples, a vehicle includes a steering system having a user-operated steering control configured to steer the vehicle. The vehicle includes a controller independent of the steering system and configured to receive an indication that the steering system employs dynamic steering angle ratio adjustment of the steering control, and modify an operation of the controller based on the indication.

18 Claims, 3 Drawing Sheets

(56) References Cited

OTHER PUBLICATIONS

James Dolan, What Is Steer-by-Wire Technology? Aug. 1, 2022 (12 pages).
Xiaodong Wu, Abstract only, Variable steering ratio control of steer-by-wire vehicle to improve handling performance, May 2019 (1 page).
Yih et al., Modification of Vehicle Handling Characteristics via Steer-by-Wire, 2005 (6 pages).
European Patent Office, Extended European Search Report for Appl. No. 24197706.5 dated Feb. 11, 2025 (8 pages).
Canada Office Action; Application No. 3,267,353; Jul. 6, 2026; 6 pages.
Japanese Office Action; Application No. 2024-146228; Jun. 24, 2026; 6 pages.

* cited by examiner

DYNAMIC STEERING ANGLE RATIO ADJUSTMENT INDICATION FOR A VEHICLE STEERING SYSTEM

CROSS REFERENCE TO RELATED APPLICATION

This claims the benefit under 35 U.S.C. § 119(e) of U.S. Provisional Patent Application No. 63/579,597, entitled "Dynamic Steering Angle Ratio Adjustment Indication for a Vehicle Steering System," filed Aug. 30, 2023, which is hereby incorporated by reference.

BACKGROUND

A vehicle can include a steering system that has a steering control operated by a user to adjust a direction of travel of the vehicle. Examples of steering controls can include any or some combination of the following: a steering wheel, a steering yoke, a steering stick, or any other type of steering control that is operable by the driver. The steering control when displaced by the driver causes vehicle wheels to pivot relative to a current travel direction of the vehicle.

BRIEF DESCRIPTION OF THE DRAWINGS

Some implementations of the present disclosure are described with respect to the following figures.

Figure 1:
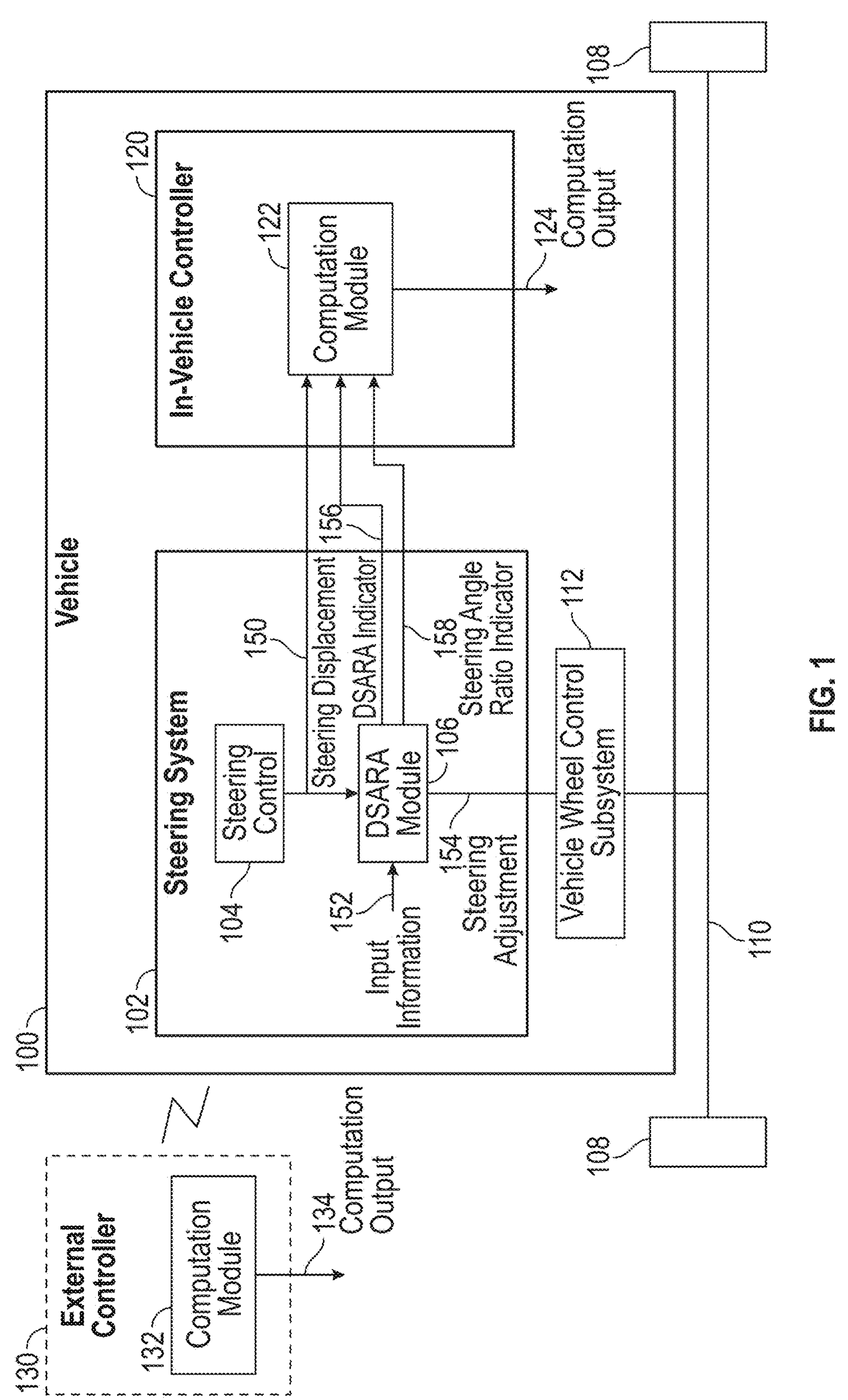
FIG. 1 is a block diagram of an arrangement that includes a vehicle that supports dynamic steering angle ratio adjustment of a steering control of the vehicle, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Examples of vehicles include automobiles, trucks, buses, motorcycles, or other types of vehicles, whether currently existing or after arising. A steering system of a vehicle can include a steering control that is operable by a driver of the vehicle. The steering control can be in the form of a steering wheel, a steering yoke, a steering stick, or any other type of control that when displaced causes a vehicle wheel to pivot relative to a current travel direction of the vehicle. A "vehicle wheel" on a vehicle refers to a circular object that revolves on an axle and that includes an element, such as a tire, that engages a road surface. A vehicle can include two vehicle wheels, three vehicle wheels, four vehicle wheels, or more than four vehicle wheels.

A "displacement" of a steering control can refer to either a rotational displacement or a linear displacement. For example, a steering wheel or a steering yoke is rotated by a driver to cause a pivot of vehicle wheels. In further examples, a steering stick (which is a user-operable elongated member) can be displaced linearly, such as in a lateral direction (e.g., left and right directions), to cause a pivot of the vehicle wheels. A displacement of the steering control can cause a pivot of the front vehicle wheels and/or rear vehicle wheels.

A "current travel direction" of the vehicle can refer to the direction along which the vehicle is traveling if the vehicle is moving or the direction along which the vehicle would travel if the vehicle starts to move from a stationary state. "Pivoting" a vehicle wheel relative to the current travel direction of the vehicle deviates a heading direction of the vehicle wheel from the current travel direction of the vehicle.

Traditionally, a steering system employs a mechanical link between the steering column (to which the steering control is attached) and the vehicle wheels. A displacement of the steering control would be mechanically coupled to the vehicle wheels to cause pivoting of the vehicle wheels. With such a traditional steering system, a steering angle ratio between the displacement of the steering control and the pivoting of the vehicle wheels is constant.

Another type of steering system is a steer-by-wire system, in which a displacement of the steering control is electrically communicated to an electronic control unit that controls actuators to cause pivoting of the vehicle wheels. In the steer-by-wire system, there is no mechanical link between the steering control and the vehicle wheels.

A steer-by-wire system may implement dynamic steering angle ratio adjustment to adjust how much a displacement of a steering control of the steering system affects the pivoting of vehicle wheels. Dynamic steering angle ratio adjustment involves changing a steering angle ratio between a displacement of the steering control and a corresponding pivot of a vehicle wheel. The steering angle ratio can be changed in response to changes in any or some combination of the following: vehicle speed, vehicle acceleration, vehicle location (e.g., based on global positioning system (GPS) coordinates), vehicle engine torque, a driver preference, a level of experience of a driver, operating conditions (e.g., weather conditions, presence of road hazards, etc.), or any other factor. Dynamically adjusting the steering angle ratio can improve steering agility at low speed and steering stability at high speed.

In examples in which the steering control is rotated by a driver, the steering angle ratio can refer to the number of degrees that the steering control has to rotate to pivot the vehicle wheel by one degree. More generally, the steering angle ratio can refer to the amount of rotation of the steering control that causes pivoting of the vehicle wheel by a target angular rotation. In further examples where the steering control is linearly displaced, the steering angle ratio can refer to the amount of linear displacement that causes pivoting of the vehicle wheel by the target angular rotation.

In an example where dynamic steering angle ratio adjustment is used, at a lower speed of the vehicle, the steering angle ratio may be set at a higher value such that a larger displacement of the steering control is used to cause a target amount of pivoting of the vehicle wheel. At a higher speed of the vehicle, the steering angle ratio may be set at a lower value such that a smaller displacement of the steering control is used to cause the target amount of pivoting of the vehicle wheel. The steering angle ratio may be inversely proportional to the vehicle speed. Stated differently, with a steering system that employs dynamic steering angle ratio adjustment, the variation of the steering angle ratio at different vehicle speeds causes a given displacement of the steering control to produce different amounts of pivoting of the vehicle wheel (i.e., an amount of pivoting of the vehicle wheel for a given displacement of the steering control is compensated based on the steering angle ratio). When dynamic steering angle ratio adjustment is employed, a vehicle's steering becomes more sensitive to steering control displacement at higher vehicle speeds, and less sensitive to steering control displacement at lower vehicle speeds.

In further examples, dynamic steering angle ratio adjustment can cause the steering angle ratio to change in response to changing accelerations of the vehicle, or in response to any of the other factors noted above. For example, the steering angle ratio can be changed as the vehicle changes locations; the steering angle ratio can be changed as the vehicle engine torque changes; the steering angle ratio can be changed based on a driver preference (e.g., stored as a user setting in a memory of the vehicle); the steering angle ratio can be changed based on a level of experience of the driver (e.g., the vehicle can include a sensor to detect who the driver is and the level of experience of the driver); the steering angle ratio can be changed as operating conditions change (the steering angle ratio can be set at a first value when it is not raining or snowing or hailing and the steering angle ratio can be set at a different second value when there is rain or snow or hail or other inclement weather); and so forth.

A vehicle may include a controller (which can include a program or a hardware processing circuit) that produces an output (e.g., a prediction, an analytical output, etc.) based on various inputs, where the inputs include displacements of the steering control of the vehicle. An example controller may predict impairment of a driver of the vehicle. For example, the driver may be intoxicated or may be experiencing acute health issues, which may impair the ability of the driver to safely operate the vehicle. As another example, the driver may be an inexperienced driver who may make erratic adjustments of the steering control that can lead to unsafe vehicle operations.

The controller may base its output on the absolute displacement of the steering control. However, in a vehicle with a steering system that employs dynamic steering angle ratio adjustment, outputs produced by the controller based on absolute displacements of the steering control may not be accurate. For example, with a steering system that employs dynamic steering angle ratio adjustment, a driver that makes large adjustments of the steering control at low vehicle speeds is consistent with normal driving behavior, such as when the driver is parking the vehicle or driving around obstacles in a parking lot or another location. However, at higher vehicle speeds, the same large displacements of the steering control (especially if such displacements of the steering control are erratic) can be indicative of an impairment of the driver. The controller that does not take into account that a steering system employs dynamic steering angle ratio adjustment may falsely indicate that the driver is impaired when the driver makes large displacements of the steering control at low vehicle speeds, or the controller may falsely indicate that the driver is not impaired when the driver makes small displacements of the steering control at high vehicle speeds.

In accordance with some implementations of the present disclosure, an indicator is used to indicate that a steering system of the vehicle employs dynamic steering angle ratio adjustment of a steering control of the steering system. The indicator can be in the form of a signal or an information element. For example, an information element can be exchanged between programs, such as in messages, using a memory, using an application programming interface, or using any other type of interface. An information element can be set to a first value or a different second value, where the information element set to the first value indicates that the steering system employs dynamic steering angle ratio adjustment, and where the information element set to the second value indicates that the steering system does not employ dynamic steering angle ratio adjustment.

In other examples, the indicator can be a signal, such as a signal on a bus of the vehicle. The bus can connect various electronic components of the vehicle, to allow the electronic components to communicate with one another. A signal can be set to a first state or a different second state. The signal set to the first state indicates that the steering system employs dynamic steering angle ratio adjustment. However, the signal set to the second state indicates that the steering system does not employ dynamic steering angle ratio adjustment.

More generally, an indicator can be set to a first state to indicate that dynamic steering angle ratio adjustment is employed, and set to a different second state to indicate that dynamic steering angle ratio adjustment is not employed. A controller in the vehicle can receive the indicator, and the controller can determine, based on a state of the indicator, whether the vehicle's steering system employs dynamic steering angle ratio adjustment. The controller can modify the controller's computations or behavior based on whether the vehicle's steering system employs dynamic steering angle ratio adjustment.

FIG. 1 is a block diagram of an example arrangement including a vehicle 100 that has a steering system 102. The steering system 102 includes a steering control 104, which can be operated by the driver of the vehicle 100. Operation of the steering control 104 by the driver causes a displacement (rotational displacement or linear displacement) of the steering control 104.

The steering control 104 outputs a steering displacement value 150 that represents an amount of displacement of the steering control 104 when adjusted by the driver. The steering displacement value 150 can be either a rotational angle that represents how many degrees the steering control 104 was rotated or an offset that represents an amount of linear displacement of the steering control 104 when displaced.

The steering displacement value 150 is provided to a dynamic steering angle ratio adjustment (DSARA) module 106, which dynamically adjusts a steering angle ratio of the steering system 102 based on input information 152 that represents a movement of the vehicle 100. As examples, the input information 152 includes a speed of the vehicle 100, or an acceleration of the vehicle 100, or both. The acceleration of the vehicle 100 can include longitudinal acceleration (acceleration in the current travel direction of the vehicle 100), or lateral acceleration (acceleration in a direction that is orthogonal to the current travel direction of the vehicle 100), or both. Based on the speed or the acceleration or both, the DSARA module 106 can adjust the steering angle ratio of the steering system 102. In further examples, the input information 152 can include additional or alternative parameters, such as any or some combination of the following: vehicle location, vehicle engine torque, a driver preference, a level of experience of the driver, operating conditions, or any other factor.

The DSARA module 106 can be implemented with machine-readable instructions executed by one or more hardware processors. Alternatively, the DSARA module 106 can be implemented with hardware processing circuitry, such as a programmable integrated circuit, a programmable gate array, or another hardware processing circuit.

Based on the steering displacement value 150 from the steering control 104 and the steering angle ratio set by the DSARA module 106, the DSARA module 106 generates a steering adjustment value 154 that is output to a vehicle wheel control subsystem 112 that controls the pivoting of vehicle wheels 108. The steering adjustment value 154 represents an amount of pivoting of the vehicle wheels 108. The vehicle wheels are mounted to an axle 110 of the vehicle 100.

The vehicle wheel control subsystem 112 can include an electronic control unit that receives the steering adjustment value 154. Based on the steering adjustment value 154, the electronic control unit controls an actuator to pivot the vehicle wheels 108.

The vehicle 100 further includes an in-vehicle controller 120 that is independent of the steering system 102. The in-vehicle controller 120 is separate and distinct from the steering system 102. The in-vehicle controller 120 is "independent" of the steering system 102 if the in-vehicle controller 120 performs a non-steering operation that is independent of a steering operation of the vehicle 100.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software or firmware or both) executable on the hardware processing circuit.

The DSARA module 106 outputs a DSARA indicator 156 and a steering angle ratio indicator 158 to the in-vehicle controller 120. The DSARA indicator 156 if set to a first state indicates that dynamic steering angle ratio adjustment is enabled (or supported). The DSARA indicator 156 if set to a second state indicates that dynamic steering angle ratio adjustment is disabled (or not supported).

The steering angle ratio indicator 158 represents a value of the steering angle ratio as adjusted by the DSARA module 106 based on the input information 152. The value can be one of a range of values representing different steering angle ratios. The values may be floating point values, integer values, and so forth.

In some examples, the steering displacement value 150, the DSARA indicator 156, and the steering angle ratio indicator 158 can be signals according to a standard, such as the Connected Vehicle Systems Alliance (COVESA) Vehicle Signal Specification (VSS). The present version of the COVESA VSS does not specify such a steering angle ratio indicator. However, future versions of the COVESA VSS may include such a steering angle ratio indicator. In other examples, the steering displacement value 150, the DSARA indicator 156, and the steering angle ratio indicator 158 may be according to other protocols, whether proprietary, standardized, or open source.

In some examples, the in-vehicle controller 120 includes a computation module 122 that performs a computation (e.g., a prediction, an analytic computation, etc.) based on various inputs, including the steering displacement value 150 received from the steering control 104, and the DSARA indicator 156 and the steering angle ratio indicator 158 from the DSARA module 106. The computation performed by the computation module 122 pertains to an aspect of the vehicle 100 or the driver of the vehicle 100, and the computation takes into account whether dynamic steering angle ratio adjustment is employed (DSARA indicator 156 set to the first state) by the steering system 102. If dynamic steering angle ratio adjustment is employed, the computation module 122 performs computations that considers both the steering displacement value 150 and the steering angle ratio represented by the steering angle ratio indicator 158. If dynamic steering angle ratio adjustment is not employed, the computation module 122 performs computations that considers the steering displacement value 150 unaffected by a steering angle ratio.

The computation module 122 generates a computation output 124 based on the various inputs. For example, the computation output 124 may include an indication of whether the driver of the vehicle 100 is impaired. The indication can be in the form of a flag that can be set to different states to indicate impairment or no impairment. Alternatively, the indication can be one of a range of values indicating respective different levels of impairment of the driver. The computation output 124 may be stored in a memory for later analysis. As another example, the computation output 124 is sent to an entity in the vehicle 100 to take action in response to the computation output 124. The entity can issue an audible alert (using a vehicle speaker), a visual alert (displayed by a display device of the vehicle 100), or a tactile alert (by vibrating the steering control 104 or another element in the vehicle 100) to provide a warning of driver impairment. As a further example, the entity in response to the computation output 124 indicating driver impairment can disable the vehicle engine (assuming it is safe to do so), engage autonomous driving of the vehicle 100 (assuming the vehicle 100 supports autonomous driving), or perform another action to mitigate against the risks of driver impairment. In other examples, the computation output 124 is sent to an entity that is external of the vehicle 100, such as to law enforcement, to a family member's mobile device, or another entity.

In other examples, the computation module 122 can perform other types of computations based on the steering displacement value 150, the DSARA indicator 156, and the steering angle ratio indicator 158. Examples of other computations can include computations to rank the driving behavior of the driver (e.g., safe driver, unsafe driver), computations to determine whether the vehicle 100 is experiencing or expected to experience a malfunction, or other computations. Further, the computation module 122 can perform computations based on measurement data of other sensors or other input information.

In other examples, instead of or in addition to the in-vehicle controller, an external controller 130 (such as a controller in the cloud or a server) includes a computation module 132 to generate a computation output 134 based on the steering displacement value 150, the DSARA indicator 156, and the steering angle ratio indicator 158. The computations of the computation module 132 in the external controller 130 may be similar to the computations of the computation module 122 in the in-vehicle controller 120. The external controller 130 can communicate wirelessly with the vehicle 100. For example, the steering displacement value 150, the DSARA indicator 156, and the steering angle ratio indicator 158 can be sent wirelessly from the vehicle 100 to the external controller 130. Also, the computation output 134 may be sent wirelessly to the vehicle 100.

Figure 2A:
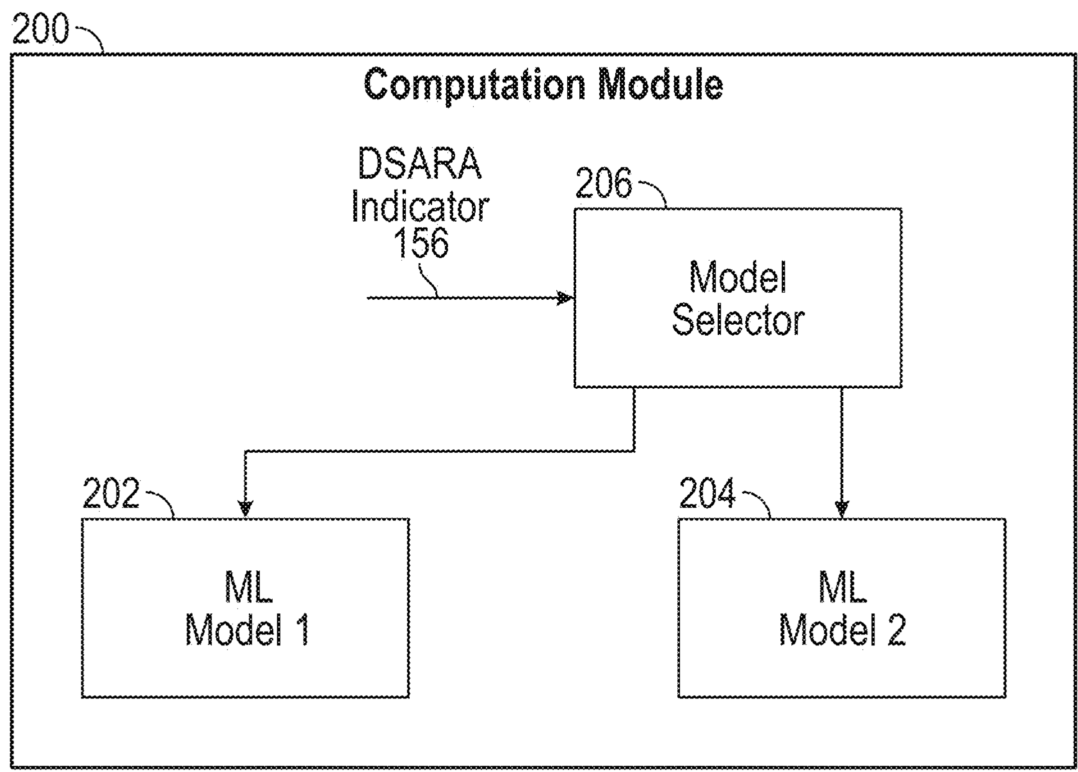
FIG. 2A and FIG. 2B are block diagrams of computation modules according to some examples of the present disclosure.
Figure 2B:
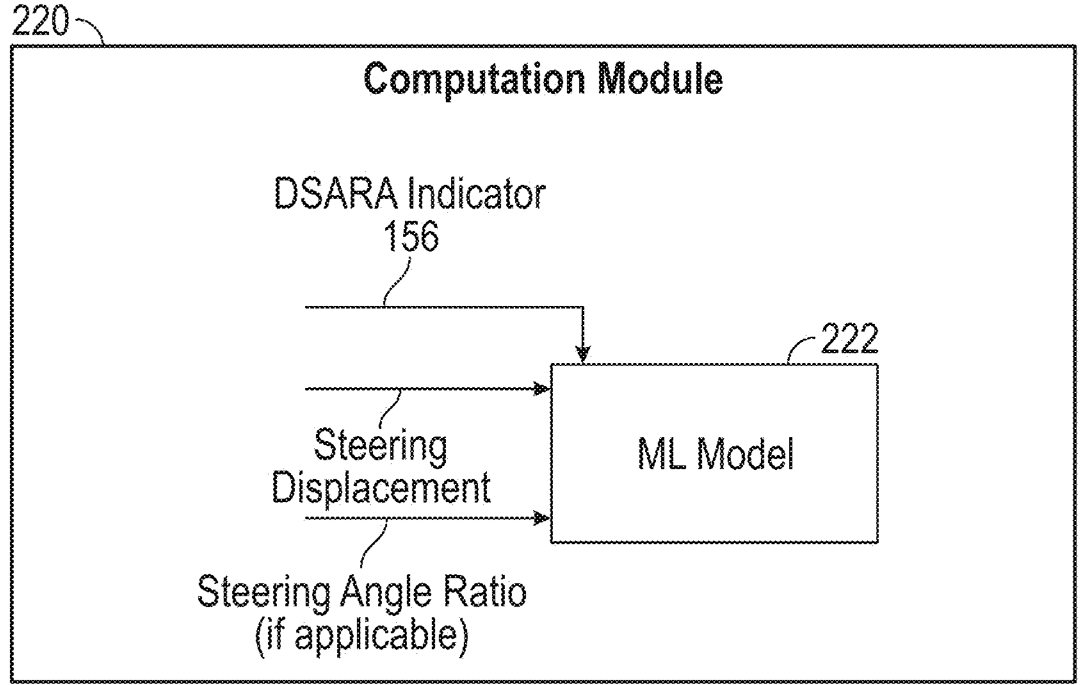

FIGS. 2A and 2B show examples of computation modules that employ machine learning models. In other examples, a computation module does not employ machine learning models.

FIG. 2A depicts a computation module 200 according to some examples. The computation module 200 is an example of the computation module 122 or 132 of FIG. 1. In the example of FIG. 2A, the computation module 200 is able to selectively use one of multiple machine learning models, including a machine learning model 202 and a machine learning model 204. A "machine learning model" refers to a model that can be trained to make a prediction or more generally produce an output based on an input collection of features, such as parameters that each can be assigned multiple different values. Examples of inputs to the machine learning model 202 include steering displacement values and steering angle ratios. The machine learning model 202 is trained using training data that includes steering angle ratios and steering displacement values. The machine learning model 202 thus recognizes that vehicle wheel pivoting is compensated based on application of steering angle ratios to steering displacements. The machine learning model 202 detecting driver impairment can be trained on vehicles that use steering angle ratio adjustments, for example.

The machine learning model 204, on the other hand, is trained without the use of steering angle ratios. The machine learning model 204 produces an output based on steering displacement values, but not based on steering angle ratios. The machine learning model 204 can be trained to recognize that certain patterns of steering displacements are indicative of driver impairment, for example.

The computation module 200 includes a model selector 206 that selects one of the machine learning model 202 or the machine learning model 204 based on the state of the DSARA indicator 156. If the DSARA indicator 156 is set to the first state to indicate that dynamic steering angle ratio adjustment is enabled, the model selector 206 selects the machine learning model 202 to use by the computation module 200. On the other hand, if the DSARA indicator 156 is set to the second state to indicate that dynamic steering angle ratio adjustment is not enabled, the model selector 206 selects the machine running all 204 for use by the computation module 200.

FIG. 2B shows an example of a computation module 220 that employs a single machine learning model 222 (instead of multiple machine learning models as shown in FIG. 2A). The machine learning model 222 can produce an output based on a collection of inputs that may or may not include steering angle ratios. In other words, the machine learning model 222 is able to produce outputs based on steering displacement values whether compensated by steering angle ratios as long as it understands that steering angle ratio adjustments have been applied.

As shown in FIG. 2B, inputs received by the machine learning model 222 include steering displacement values and if applicable, steering angle ratios. The machine learning model 222 also receives the DSARA indicator 156. If the DSARA indicator 156 is set to the first state, the machine learning model 222 generates an output based on both steering displacement values and steering angle ratios. If the DSARA indicator 156 is set to the second state, the machine learning model 222 generates an output based on steering displacement values but not steering angle ratios.

The machine learning model 222 has been trained both with training data including both steering displacement values and steering angle ratios and training data including steering displacement values but without steering angle ratios.

Figure 3:
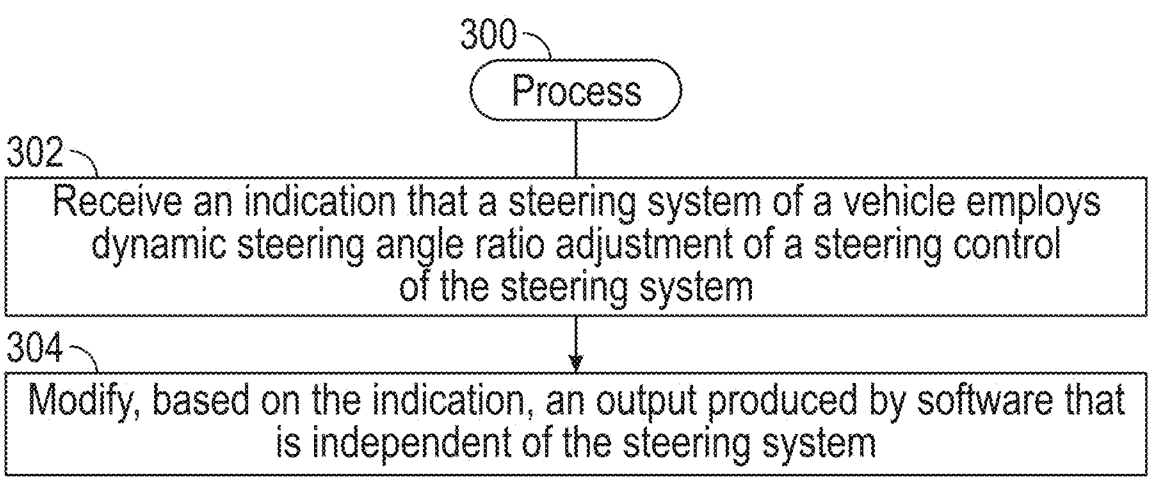
FIG. 3 is a flow diagram of a process according to some examples.

FIG. 3 is a flow diagram of a process 300 according to some examples. The process 300 can be performed by a system, such as a vehicle (e.g., 100 in FIG. 1) or a computer system.

The process 300 includes receiving (at 302), at the system, an indication that a steering system of a vehicle employs dynamic steering angle ratio adjustment of a steering control of the steering system. For example, the indication can include the DSARA indicator 156 (FIG. 1) set to the first state. The steering system is configured to apply dynamic steering angle ratio adjustment of the steering control by adjusting, based on the input information 152 of the vehicle, a relationship (e.g., an angle ratio) between a displacement of the steering control and a corresponding pivoting of vehicle wheels.

The process 300 includes modifying (at 304), by the system based on the indication, an output produced by software that is independent of the steering system. The software can include the computation module 122 or 132 of FIG. 1, the computation module 200 of FIG. 2A, or the computation module 220 of FIG. 2B. Modifying the output produced by the software can refer to the software generating an output that takes into account variations in steering angle ratios (and more specifically, how steering displacement values are compensated by steering angle ratios). In the example of FIG. 2A, modifying the output produced by the software can be accomplished by selecting the machine learning model 202 if the indication is received, and selecting the machine learning model 204 if an indication is received that dynamic steering angle ratio adjustment is not employed.

In the example of FIG. 2B, modifying the output produced by the software can be accomplished based on the machine learning model 222 generating an output based on steering angle ratios and steering displacements based on receiving the indication. If an indication is received by the machine learning model 222 that dynamic steering angle ratio adjustment is not employed, the machine learning model 222 generates an output based on steering displacements but not steering angle ratios.

Figure 4:
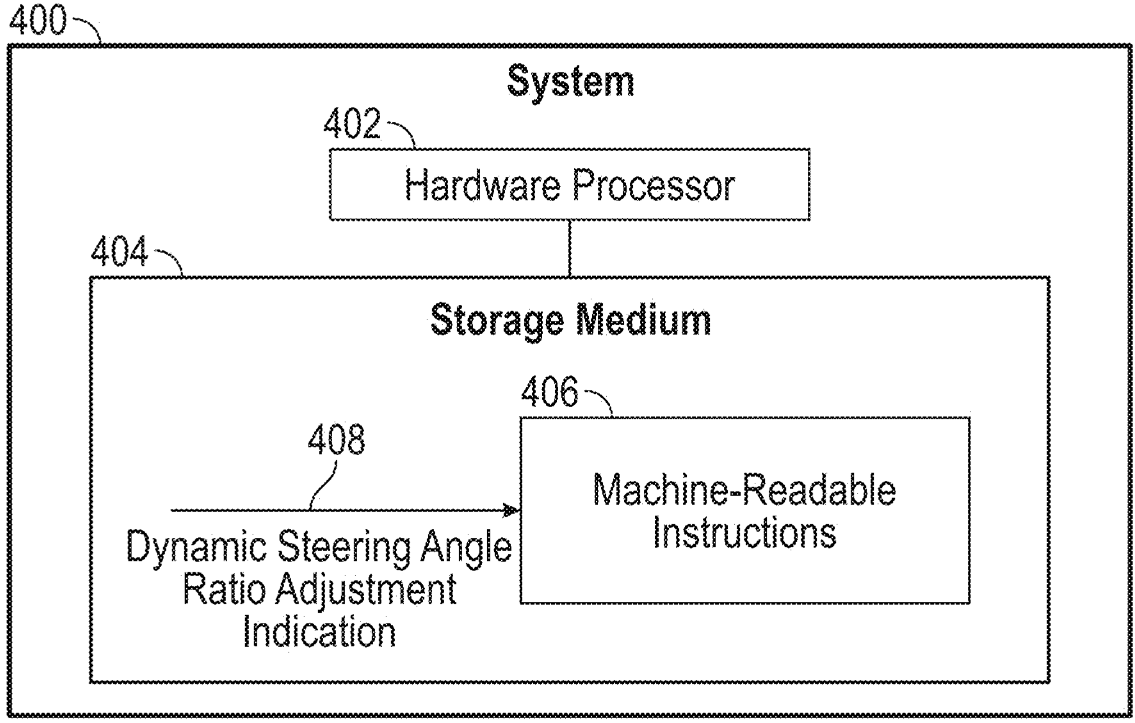
FIG. 4 is a block diagram of a system according to some examples.

FIG. 4 is a block diagram of a system 400 according to some examples of the present disclosure. The system 400 can be the vehicle 100 of FIG. 1, the in-vehicle controller 120, or the external controller 130. The system 400 includes one or more hardware processors 402. A hardware processor can include a microprocessor, a core of a multi-core microprocessor, a microcontroller, a programmable integrated circuit, a programmable gate array, or another hardware processing circuit.

The system 400 includes a non-transitory machine-readable or computer-readable storage medium 404 storing machine-readable instructions 406 that upon execution cause the system 400 to perform various tasks. The machine-readable instructions 406 when executed receive a dynamic steering angle ratio adjustment indication 408 that a steering system of the vehicle employs dynamic steering angle ratio adjustment of a steering control of the steering system. The machine-readable instructions 406 modify a non-steering operation for the vehicle based on the dynamic steering angle ratio adjustment indication.

In some examples, the non-steering operation includes a determination of an impairment of a driver of the vehicle. In other examples, the non-steering operation includes a determination of a malfunction of the vehicle.

In some examples, the non-steering operation is performed by software in the vehicle, and the modifying of the non-steering operation modifies an operation of the software. The indication includes an indicator set to a first state, and the software produces an output based on a displacement of the steering control and a steering angle ratio in response to the indicator being set to the first state. The software produces an output based on a displacement of the steering control uncompensated by a steering angle ratio in response to the indicator being set to a second state different from the first state.

In some examples, the non-steering operation produces an output that is indicative of an issue associated with the vehicle or a driver of the vehicle, and the machine-readable instructions 406 upon execution cause the system to transmit the output to an entity to address the issue.

A storage medium (e.g. 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A vehicle comprising:

a steering system comprising a user-operated steering control configured to steer the vehicle; and a controller independent of the steering system and configured to:

receive an indication that the steering system employs dynamic steering angle ratio adjustment of the steering control, and modify an operation of the controller based on the indication, wherein the steering system is configured to apply dynamic steering angle ratio adjustment of the steering control by adjusting, based on input information, a relationship between a displacement of the steering control and a corresponding pivoting of vehicle wheels of the vehicle, and wherein the input information comprises one or more selected from among: a speed of the vehicle, an acceleration of the vehicle, a location of the vehicle, a torque of an engine of the vehicle, a driver preference, a level of experience of a driver, or an operating condition.

2. The vehicle of claim 1, wherein the indication comprises a signal set to a first state or an information element set to a first value.

3. The vehicle of claim 1, wherein the indication comprises a signal on a bus.

4. The vehicle of claim 1, wherein the indication comprises a signal according to a Connected Vehicle Systems Alliance (COVESA) Vehicle Signal Specification.

5. The vehicle of claim 1, wherein the indication comprises an information element exchanged by software.

6. The vehicle of claim 1, wherein the indication comprises an indicator set to a first state, and wherein the modifying of the operation of the controller comprises selecting, by the controller, a first model of a plurality of different models to use based on the indicator set to the first state.

7. The vehicle of claim 6, wherein the controller is configured to select a second model of the plurality of different models in response to the indicator set to a second state different from the first state.

8. The vehicle of claim 7, wherein the first model is trained using training data comprising steering displacement values and steering angle ratios, and the second model is trained using training data comprising steering displacement values but without steering angle ratios.

9. The vehicle of claim 1, wherein the modifying of the operation of the controller comprises providing the indication as an input to a model that is able to produce outputs based on steering displacement values whether or not compensated by steering angle ratios.

10. A non-transitory machine-readable storage medium comprising instructions that upon execution cause a system to:

receive an indication that a steering system of a vehicle employs dynamic steering angle ratio adjustment of a steering control of the steering system; and modify a non-steering operation for the vehicle based on the indication, wherein the steering system is configured to apply dynamic steering angle ratio adjustment of the steering control by adjusting, based on input information, a relationship between a displacement of the steering control and a corresponding pivoting of vehicle wheels of the vehicle, and wherein the input information comprises one or more selected from among: a speed of the vehicle, an acceleration of the vehicle, a location of the vehicle, a torque of an engine of the vehicle, a driver preference, a level of experience of a driver, or an operating condition.

11. The non-transitory machine-readable storage medium of claim 10, wherein the non-steering operation comprises a determination of an impairment of a driver of the vehicle.

12. The non-transitory machine-readable storage medium of claim 10, wherein the non-steering operation comprises a determination of a malfunction of the vehicle.

13. The non-transitory machine-readable storage medium of claim 10, wherein the non-steering operation is performed by software in the vehicle, and the modifying of the non-steering operation modifies an operation of the software.

14. The non-transitory machine-readable storage medium of claim 13, wherein the indication comprises an indicator set to a first state, and wherein the software produces an output based on a displacement of the steering control and a steering angle ratio in response to the indicator being set to the first state.

15. The non-transitory machine-readable storage medium of claim 14, wherein the software produces an output based on a displacement of the steering control uncompensated by a steering angle ratio in response to the indicator being set to a second state different from the first state.

16. The non-transitory machine-readable storage medium of claim 10, wherein the non-steering operation produces an output that is indicative of an issue associated with the vehicle or a driver of the vehicle, and wherein the instructions upon execution cause the system to transmit the output to an entity to address the issue.

17. A method of a system comprising a hardware processor, comprising:

receiving, at the system, an indication that a steering system of a vehicle employs dynamic steering angle ratio adjustment of a steering control of the steering system; and modifying, by the system based on the indication, an output produced by software that is independent of the steering system, wherein the indication comprises an indicator set to a first state, and wherein the software produces the output based on a displacement of the steering control and a steering angle ratio in response to the indicator being set to the first state, and wherein the software produces an output based on a displacement of the steering control uncompensated by a steering angle ratio in response to the indicator being set to a second state different from the first state.

18. The method of claim 17, wherein the output is indicative of an issue with the vehicle or a driver of the vehicle.

* * * * *